July 28, 1942. H. H. WARNER ET AL 2,291,514
HAND SCRAPER
Filed May 5, 1939

INVENTORS
HARRY H. WARNER
GORDON H. TESSMER
BY Cooper, Kerr + Dunham
Their ATTORNEYS Patented July 28, 1942

2,291,514

UNITED STATES PATENT OFFICE 2,291,514

HAND SCRAPER

Harry H. Warner and Gordon H. Tessmer, Minneapolis, Minn., assignors to Warner Manufacturing Co., Minneapolis, Minn., a corporation of Minnesota Application May 5, 1939, Serial No. 271,825

5 Claims. (Cl. 30—162)

The present invention pertains to a hand scraper suitable for many purposes, but particularly serviceable in the hands of painters who, when working around windows, frequently find it necessary to remove dry paint spatterings from the glass.

An object of the invention is to provide a tool in which the scraper blade may be instantly retracted so that the tool may safely be dropped into the workman's pocket, and in which the blade may be just as quickly protracted when needed again.

Another object is to provide means for automatically locking the blade in its protracted and retracted positions.

Another object is to so design the blade moving means that the shifting and locking operations may be performed instantly by the thumb of the operator.

Another object is to provide a tool which will feel comfortable in the hands of the workman.

Another object is to hold the blade in the tool solely by a friction clamp so that the blade may be replaced by simply pushing out the old blade and pushing in a new one.

Another object is to adapt the device for use as a knife for cutting or slitting purposes by providing a stop for one end of the blade when the blade is protracted.

Another object is to provide a tool in which the ends of the blade are substantially flush with the edges of the case or holder.

Another object is to provide a tool in which easily procured safety razor blades may be used as scrapers.

Further and other objects and advantages will be apparent from the specification and claims, and from the accompanying drawing which illustrates what is now considered the preferred embodiment of the invention.

Figure 2:
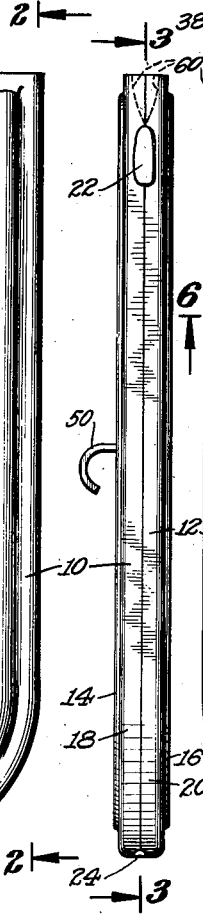
Fig. 2 is a view on line 2—2 of Fig. 1.
Figure 5:
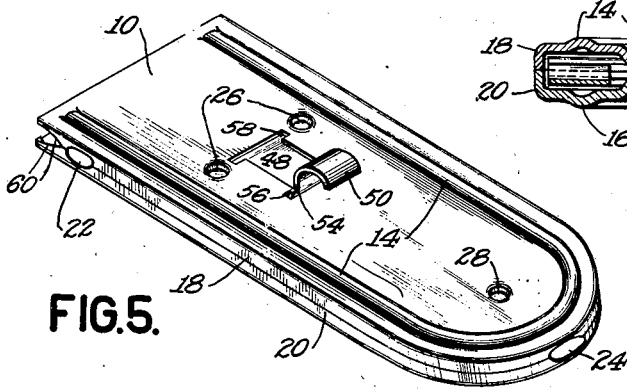
Fig. 5 is an isometric view of the tool.
Figure 6:
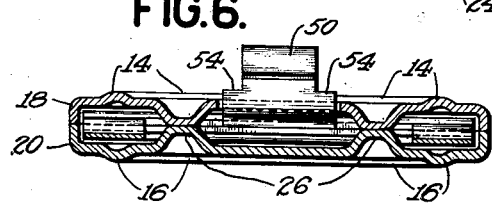
Fig. 6 is a cross-section on line 6—6 of Fig. 3.

In the drawing the case or holder comprises a pair of dished stamped metal members 10 and 12 which may be provided with stiffening ribs 14 and 16. The stamped members have abutting rims 18 and 20 (Fig. 6) welded together as indicated at 22, 24 (Figs. 2 and 5). Members 10 and 12 may also be joined together by spot welds, as at 26, 28. The welds may be replaced by bolts or rivets if desired.

The assembled holder is closed around both sides and the rounded end. The other end is unflanged and open, as indicated at 30 (Fig. 4).

Figure 3:
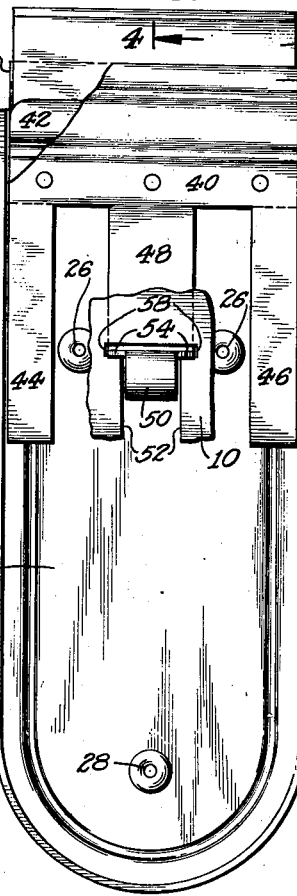
Fig. 3 is a view on line 3—3 of Fig. 2 with portions broken away.
Figure 4:
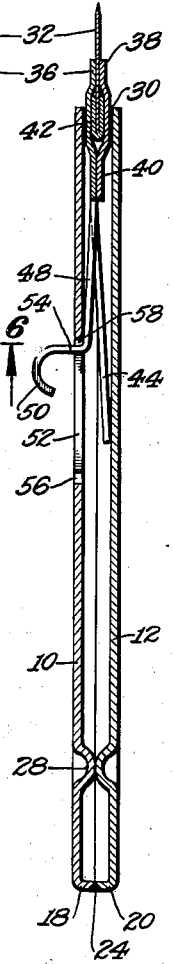
Fig. 4 is a cross-section on line 4—4 of Fig. 3.

Adapted for reciprocation into and out of the open end of the holder, is the blade 32 (Figs. 3 and 4). The blade is clamped between jaws 36, 38 of a spring or compression clamp 40. Blade 32, as illustrated, has a reinforced back 42. Integral with clamp 40 and extending inwardly of the case are three spring fingers 44, 46 and 48. Fingers 44 and 46 bear against member 12, and finger 48 against member 10, thus providing sufficient friction to prevent inadvertent movement of clamp and blade relatively to the holder.

Finger 48 has a curved thumb-piece 50 projecting through a slot 52 in plate 10 of the case. The thumb-piece and slot 52 are narrower than the body portion of finger 48 and the upturned ears 54 of 48, adjacent the thumb-piece, are adapted, when the thumb-piece is released, to automatically engage notches 56, 56, or 58, 58, in plate 10.

Figure 1:
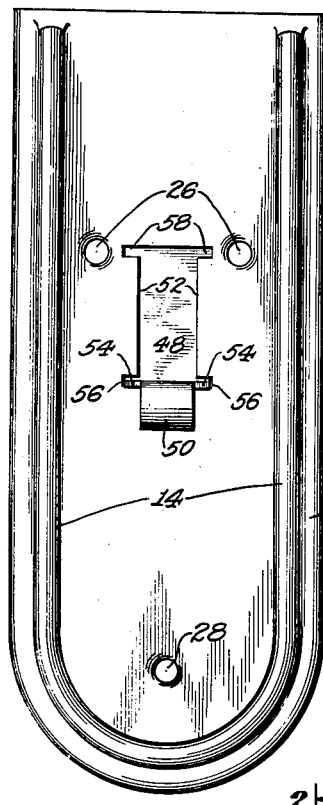
Figure 1 is a top view of the tool.

Normally, the parts are as in Figs. 1 and 2 with clamp and blade within the holder, and ears 54 engaging slots 56. When the operator wants to use the tool he depresses thumb-piece 50 with his thumb and pushes it towards the open end of the case until ears 54 enter and resiliently engage slots 58, thus placing the scraper in operative position as in Figs. 3 and 4. To retract the scraper he simply reverses the thumb operation.

Whenever the blade 32 is protracted it may be removed from jaws 36, 38 through notch 60 provided for that purpose at one edge of the open end of the case (Fig. 5). The removal operation may conveniently be performed by placing the other end of the blade against any firm object and pushing edgewise on the case. A new blade may be inserted through the same notch 60. The other side of the case is not notched and serves as an abutment for the end of the blade if the operator wishes to use the blade for operations such as slitting, cutting, or the like.

It is to be understood that the invention is not limited to the specific embodiment herein illustrated and described, but may be used in other ways without departure from its spirit as defined by the following claims.

We claim:

1. A tool comprising, in combination, a hollow handle, a rectangular blade provided with a cutting edge and non-cutting ends and having a normal position within said handle and an operative position with its cutting edge projecting from said handle, a compression clamp for holding said blade, said jaws being open at their ends and means associated with said compression clamp having jaws for moving said blade from either of said positions to the other, said clamp being movable with said blade, said handle being provided with a notch at one edge thereof adapted to register with an end of said clamp when said blade and said clamp are in protracted position, whereby a blade may be inserted in, or removed from, said clamp simply by pushing said blade through the notch and the jaws of said clamp.

2. The invention set forth in claim 1 in which the edge of said handle opposite to the notched edge serves as an abutment for an end of said blade and for the purposes intended.

3. A tool comprising, in combination, a hollow handle, a rectangular blade provided with a cutting edge and non-cutting ends, and having a normal position within said handle and an operative position with its cutting edge projecting from said handle, a compression clamp for holding said blade, and means associated with said compression clamp for moving said blade from either of said positions to the other, said clamp being movable with said blade, one edge of said handle serving as an abutment for an end of said blade when said blade is in its protracted position, whereby said blade may also be used for slitting and cutting purposes or the like.

4. A tool comprising, in combination, a hollow handle, a rectangular blade provided with a cutting edge and having a normal position within said handle and having an operative position with its cutting edge projecting from said handle, a compression clamp for holding said blade, and means associated with said compression clamp for moving said blade from either of said positions to the other, said moving means having a plurality of spring fingers enclosed within said handle and biased in opposite directions for frictionally engaging opposite interior walls of the hollow handle, whereby sufficient friction is provided to prevent inadvertent movement of said moving means and blade relatively to the hollow handle in all intermediate positions of said moving means between said normal and operative positions thereof.

5. The invention set forth in claim 4 in which one of said spring fingers is provided with a thumb piece projecting through a slot in one of the walls of the hollow handle for operating said moving means.

HARRY H. WARNER.
GORDON H. TESSMER.